US006561415B2

(12) United States Patent
Grant

(10) Patent No.: US 6,561,415 B2
(45) Date of Patent: May 13, 2003

(54) CALORIE MANAGEMENT SYSTEM

(76) Inventor: Katherine Grant, 940 Walnutwood Rd., Hunt Valley, MD (US) 21030

( * ) Notice: Subject to any disclaimer, the term of this patent is extended or adjusted under 35 U.S.C. 154(b) by 228 days.

(21) Appl. No.: 09/844,034

(22) Filed: Apr. 27, 2001

(65) Prior Publication Data

US 2001/0043664 A1 Nov. 22, 2001

Related U.S. Application Data

(60) Provisional application No. 60/200,126, filed on Apr. 27, 2000.

(51) Int. Cl.[7] .............................................. G06K 19/00

(52) U.S. Cl. ..................... 235/61 R; 235/123; 235/1 B; 434/127; 434/203

(58) Field of Search .............................. 235/61 R, 123; 434/127, 203

(56) References Cited

U.S. PATENT DOCUMENTS 4,912,307 A * 3/1990 Shade et al. ................ 235/123
4,965,553 A * 10/1990 DelBiondo et al. ....... 340/573.1
4,993,952 A * 2/1991 Yeh ............................ 434/191
5,338,202 A * 8/1994 Saari .......................... 434/127
5,382,165 A * 1/1995 Knox ......................... 434/127
5,796,640 A * 8/1998 Sugarman et al. .......... 708/132
5,915,854 A * 6/1999 Burke et al. .................. 40/491
6,279,958 B1 * 8/2001 Santa Cruz et al. .......... 283/65
6,341,295 B1 * 1/2002 Stotler ........................ 708/131

* cited by examiner

*Primary Examiner*—Michael G. Lee
(74) *Attorney, Agent, or Firm*—Law Offices of Royal W. Craig

(57) ABSTRACT

A bracelet for counting calories is formed by a plurality of counting beads each having an aperture there through. A monofilament line is threaded in a looping manner through the aperture of each counting bead such that the line overlaps itself within the aperture. Using this configuration and a freespace along the line, the counting beads may be selectively slid along the length of the line and retained in position, permitting the wearer to keep track of daily calorie intake by the movement and placement of the beads. A plurality of summing beads are also included and these are strung one per every five counting beads. This way, the counting beads are assigned an associative value of 100 calories per bead and are subdivided into groups of 500 calories by inter-positioned summing beads. A method of using the bracelet to count calories is also shown, the method including the steps of assigning a quantitative caloric value to each counting bead, selectively sliding a commensurate number of counting beads over one position in accordance calories ingested, summing the total calorie consumption over the course of a day by the position of the counting beads on the bracelet, and moving the counting beads back to their original position to begin tracking the next day.

12 Claims, 3 Drawing Sheets

CALORIE MANAGEMENT SYSTEM

CROSS-REFERENCE TO RELATED APPLICATION(S)

The present application derives priority from U.S. Provisional Patent Application No. 60/200,126, filed: Apr. 27, 2000.

BACKGROUND OF THE INVENTION

1. Field of the Invention

The present invention relates to dieting aids and, more particularly, to a dieting system inclusive of a calorie-counting bracelet and method of use.

2. Description of the Background

Effective weight loss depends very simply upon regulating caloric intake over time. Unfortunately, it is all too easy to lose control of calorie intake by forgetting what has been eaten, or by not counting impulsive snacks. Numerous scientific studies have shown that dieters should count and track calories and weight, and a number of nationally known dieting programs have evolved around this basic concept. However, the common pitfalls of such programs include underestimating the calories actually eaten, lack of consistent recording, or recording calories too infrequently.

In a Kaiser Permanente study of 2037 participants of a weight loss program, participants were asked to record and graph their food calories and weight every day. Some participants did so at least five days per week, others only 3–4 times per week, 1–2 times per week, or not at all. The results show that those who recorded calories 5+times per week lost significantly more weight in a shorter period of time than those who recorded their daily calorie less frequently.

While scrutinous counting helps, our general population lacks the self-discipline and dietary knowledge required to accurately track calories actually eaten on a consistent and frequent basis. Consequently, many people sense that they are not losing enough weight after dieting for a time, lose patience, and give up.

Effective calorie counting requires the proper tools to provide the necessary cues to strictly impose the following constraints:

- daily caloric intake records are kept;
- caloric intake is accurately recorded for all food consumed;
- weight change is tracked as a function of food calories and time.

It would be greatly advantageous to provide a system and device for counting calories that provides these necessary cues to maintain a continual awareness of a dieter's goals, thereby helping to ensure that the above-referenced constraints are more rigidly self-enforced and helping to achieve effective results.

SUMMARY OF THE INVENTION

It is, therefore, an object of the present invention to provide a system inclusive of a calorie counting bracelet and method of use that cues the user to keep more frequent (daily) and accurate caloric intake records of all food consumed, thereby facilitating the tracking of weight change as a function of food calories and time.

It is another object to provide a calorie-counting bracelet as described above in the form of a highly attractive jewelry item that gives no outward indication that is has anything at all to do with dieting, thereby allowing the dieting method to be practiced surreptitiously.

It is another object to provide a system and device for counting calories that provides the necessary cues to maintain a continual awareness of a dieter's goals, thereby promoting a cognitive behavioral change to good eating habits over time.

It is another object of the present invention to provide a device for counting calories which is always handy, eliminates the need for pencil and/or paper, and that is capable of keeping track of calories consumed over the course of a day.

It is a further object of the present invention to provide a device as described above that is simple, easy to use, reliable, and which does not interfere in any way with the dieter's normal routine.

According to the present invention, a system for keeping accurate daily records of caloric intake for all food consumed is disclosed, the system including a calorie counting bracelet, associated documentation, and a method of using the same to accurately count calories on a daily basis. The bracelet is formed by a plurality of counting beads each having an aperture there through. A monofilament line is threaded in a looping manner through the aperture of each counting bead such that the line overlaps itself within the aperture. Using this configuration the counting beads may be selectively slid along the length of the line and retained in position, permitting the wearer to keep track of daily calorie intake by the movement and placement of the beads. A plurality of summing beads are also included, each of the summing beads also having an aperture there through. The summing beads are strung one per every five counting beads. This way, the counting beads are assigned an associative value of 100 calories per bead and are subdivided into groups of 500 calories by inter-positioned summing beads.

A method of using the above-described bracelet to count calories is also taught, the method including the steps of assigning a quantitative caloric value to each counting bead, selectively sliding a commensurate number of counting beads over one position in accordance calories ingested, summing the total calorie consumption over the course of a day by the position of the counting beads on the bracelet, and moving the counting beads back to their original position to begin tracking the next day.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
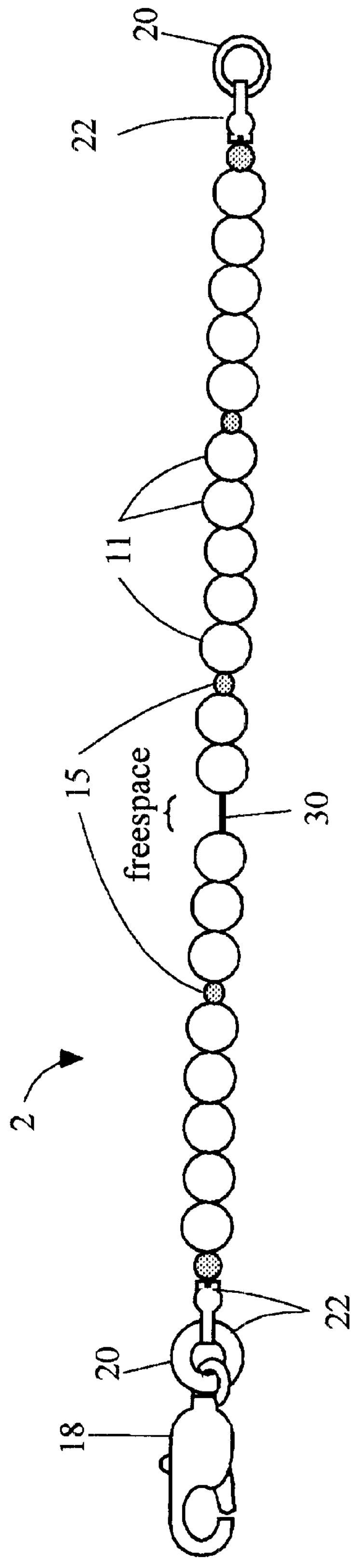
FIG. 1 is a front perspective drawing of a calorie-counting bracelet 2 according to the presently preferred embodiment of the present invention.

FIG. 1 is a front perspective drawing of a calorie-counting bracelet 2 according to the presently preferred embodiment of the present invention. The calorie-counting concept of the present invention is functionally implemented by bracelet 2 by stringing five distinct counting beads 11 for each summing bead 15. Specifically, in the illustrated embodiment, bracelet 2 is approximately 7.5 inches long and is threaded with 20 counting beads 11 evenly subdivided in groups of four by five summing beads 15. The beads 11, 15 are strung together by monofilament line 30 which is looped through and crimped at both ends. Opposing clamshell bead tips 22 hold the crimps s at the opposing ends. The clamshell bead tips 22 are commercially available components. These provide a convenient means of attachment for jump rings 20. Additionally, at one end a lobster clasp 18 is secured to jump ring 20.

One of the prime shortcomings of past calorie counting devices is their unattractiveness and blatant purpose. Most people simply do not want to advertise the fact that they are dieting, let alone wear an unattractive numeric-indicator for displaying the thousands of calories consumed in a day. In direct contrast, the bracelet 2 according to the present invention is a highly attractive jewelry item. As can be seen, this bracelet 2 arrangement has a unique and aesthetically pleasing ornamental appearance, and there is no outward indication at all that it is a dieting implement. Thus, the method of using the bracelet 2 can be practiced surreptitiously. The plurality of counting beads 11 and summing beads 15 are strung together on a length of line 30, so that the beads 11, 15 may be selectively moved by sliding for keeping track of the number of calories consumed over the course of a day. The counting beads 11 may be round or any other shape as desired. Preferably, the summing beads 15 are both visually and dimensionally distinct from the counting beads 11. These qualities can be achieved, for example, by an appropriate combination of color separation, size differential, or geometry (rounded beads versus octagonal, hexagonal, etc.). Again, one summing bead 15 is threaded for every five counting beads 11. The beads 15, 11 are threaded onto the line 30 and are secured thereon by the knot catches 22 jump rings 20, and lobster clasp 18 for wearing as a bracelet on the wrist. The proper spacing should leave a bit of slack line 30 sufficient to receive at least one counting bead 11 This provides proper space for sliding the beads 11, 15.

Figure 2:
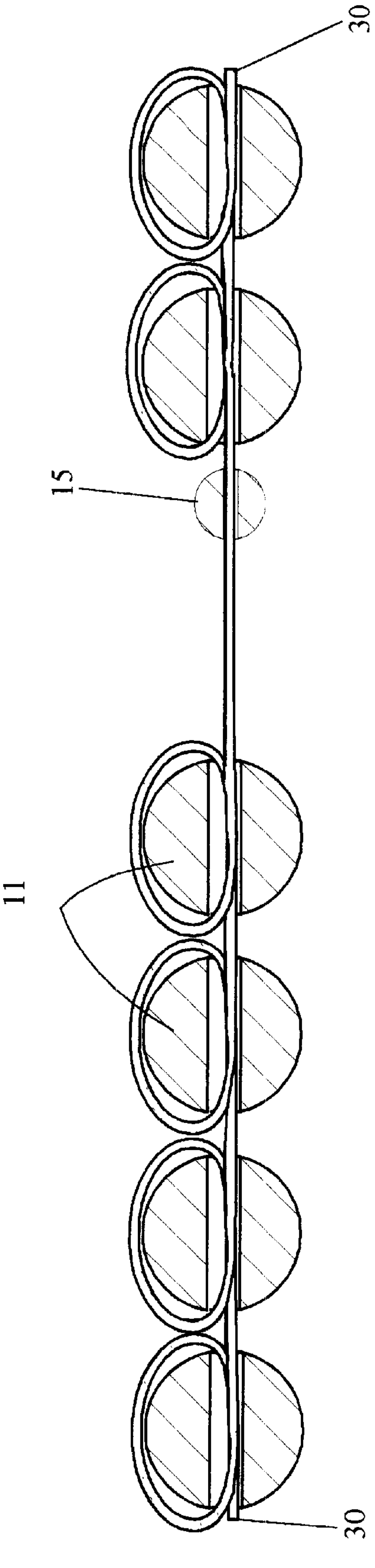
FIG. 2 is an enlarged cross-section of a length of bracelet 2 showing the manner in which beads 11, 15 are threaded.

FIG. 2 is an enlarged cross-section of a length of bracelet 2 as shown in FIG. 1 showing the manner in which beads 11, 15 are threaded. Each bead 11, 15 has an aperture extending radially through the center. The length of line 30 is, preferably, a length of very thin 0.011–0.012 inch in diameter non-elastic monofilament. A monofilament line 30 readily allows for the movement of the beads 11, yet has a sufficient coefficient of friction along its outer surface so that it maintains such beads 11 in the particular position in which they are placed.

To string the beads, the line 30 is threaded through the aperture of each bead 11 and is looped back around and threaded again through the aperture of each bead 11 in a double-threaded manner. The line 30 is then threaded once directly through the aperture of the next adjacent summing bead 15, is double-threaded through the next adjacent counting bead 11, and so on. It is presently preferred to continue threading in this manner such that the bracelet contains four groups of five counting beads 11, each group separated by a summing bead 15. The line 30 passes twice through the aperture of each bead 11 so as to overlap or cross over itself within the aperture of each bead 11. Such overlapping allows the beads 11, 15 to be selectively slid along the length of line 30 as desired, while providing a firm resistance to prevent the beads 11, 15 from freely sliding or losing their position. The beads 11, 15 stay in the position in which they were placed. When strung as indicated above, the bracelet 2 is comprised of four groups of counting beads 11 that are readily distinguishable from one another in both a tactile and visual manner via the intervening summing beads 15, so as to represent different collective units.

More specifically, and when used in accordance with the method of the present invention, each counting bead 11 is assigned a value of 100 calories. Thus, the bracelet 2 is comprised of four groups of counting beads 11, each group being worth 500 calories and being separated by the intervening summing beads 15. The method of using the above-described bracelet 2 according to the present invention includes the steps of sliding a commensurate number of counting beads 11 over one position after each meal or snack to indicate calories consumed, summing the total calorie consumption over the course of a day, tracking the daily calorie consumption, and moving the beads 11 back to their original position to begin the next day.

To fully effect the above-described method, a number of accessories are preferably packaged along with the bracelet 2.

Figure 3:
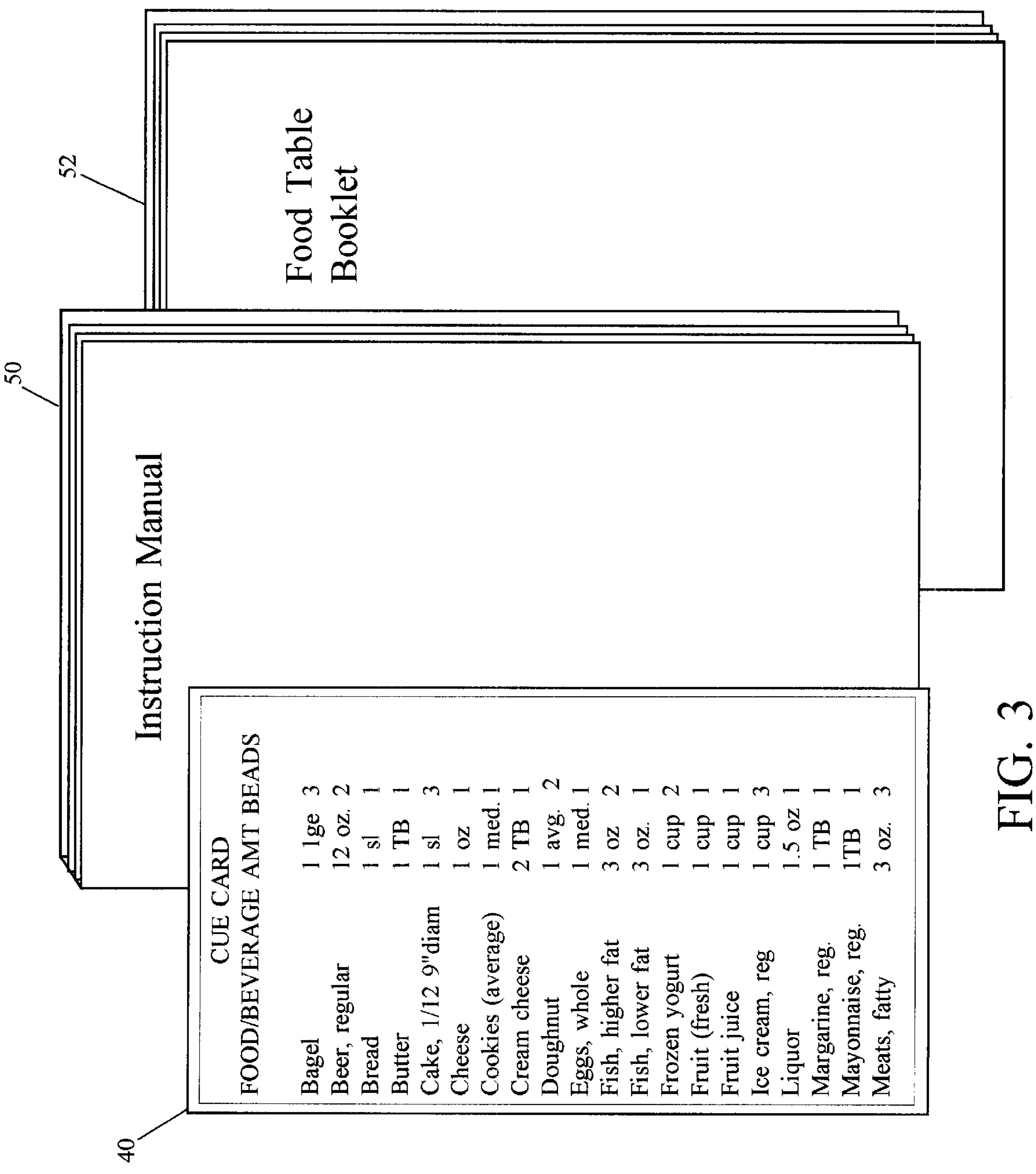
FIG. 3 is a front perspective view of a printed plastic wallet card 40 that indicates the bead values for commonly eaten foods, an instruction booklet 50 and a food table booklet 52.

FIG. 3 is a front perspective view of a printed plastic wallet card 40 that indicates the bead values for most commonly eaten foods. Given the preferred bead value of 100 calories, the wallet card preferably bears at least the following exemplary cross-references on front and back (not seen):

| FOOD/BEVERAGE | AMT | BEADS |
|---|---|---|
| Bagel | 1 lge | 3 |
| Beer, regular | 12 oz. | 2 |
| Bread | 1 sl | 1 |
| Butter | 1 TB | 1 |
| Cake, 1/12 9" diam | 1 sl | 3 |
| Cheese | 1 oz | 1 |
| Cookies (average) | 1 med. | 1 |
| Cream cheese | 2 TB | 1 |
| Doughnut | 1 avg. | 2 |
| Eggs, whole | 1 med. | 1 |
| Fish, higher fat | 3 oz | 2 |
| Fish, lower fat | 3 oz. | 1 |
| Frozen yogurt | 1 cup | 2 |
| Fruit (fresh) | 1 cup | 1 |
| Fruit juice | 1 cup | 1 |
| Ice cream, reg | 1 cup | 3 |
| Liquor | 1.5 oz | 1 |
| Margarine, reg. | 1 TB | 1 |
| Mayonnaise, reg. | 1 TB | 1 |
| Meats, fatty | 3 oz. | 3 |
| Meats, lean | 3 oz | 2 |
| Muffin, bakery | 1 lrg | 3 |
| Nuts (shelled) | 2 TB | 1 |
| Oils (all) | 1 TB | 1 |
| Pasta cooked | 1 cup | 2 |
| Pie 1/8 9" diam | 1 sl | 3 |
| Pizza, chs (1/8 med.) | 1 sl | 3 |
| Potato | 1 cup | 2 |
| Poultry, dark, no skn | 3 oz | 2 |
| Poultry, white, no skn | 3 oz | 1 |
| Rice (cooked) | 1 cup | 2 |
| Salad (chk, egg, tuna) | 1/2 cup | 2 |
| Salad dressings (reg) | 1 TB | 1 |
| Shellfish | 3 oz | 1 |
| Soft Drinks, reg | 12 oz | 2 |
| Soup (broth base) | 1 cup | 1 |
| Soup (cream base) | 1 cup | 3 |
| Sugar, jam, jelly | 2 TB | 1 |
| Vegetables (most) | 1/2 cup | 0 |
| Wine | 4 oz | 1 |

In addition, an instruction booklet 50 is also provided to explain proper use of the system, inclusive of general nutrition guidelines for nutritional adequacy and health promotion. Also included is a comprehensive food table booklet 52 that lists the bead and calorie values for 800 foods and includes a bead tracking chart for documenting daily, weekly and monthly calorie consumption.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims:

I claim:

1. A device for counting calories, comprising:

a plurality of sets of counting beads, each of said counting beads having an aperture there through;

a plurality of summing beads, each of said summing beads having an aperture there through;

a line joining said counting beads and summing beads, whereby each set of counting beads is segregated by summing beads, said line being strung in a looping manner through the aperture of each of said counting beads and summing beads such that the line loops once around each of said beads and overlaps itself within the aperture of each said bead;

a freespace located on the line between beads, whereby said counting beads and summing beads have ample space for movement along the line;

whereby said counting beads and summing beads may be selectively slid along the length of the line and retained in position, permitting the wearer to keep track of daily calorie intake by the movement and placement of the beads.

2. The calorie-counting device according to claim 1, wherein said summing beads are strung one per every five counting beads.

3. The calorie-counting device according to claim 2, wherein said counting beads are each assigned an associative value of 100 calories per bead, and are subdivided into groups of 500 calories by said summing beads.

4. The calorie-counting device according to claim 1, wherein said line is a monofilament line.

5. The calorie-counting device according to claim 4, wherein said monofilament line is within a range of from 0.011–0.012 inches in diamenter.

6. A method of using a bracelet to count calories, said bracelet including a plurality of counting beads each having an aperture there through, and a line strung in a looping manner through the aperture of each counting bead such that the line overlaps itself within the aperture of each counting bead, the method of using said bracelet including the steps of:

assigning a quantitative caloric value to each counting bead;

selectively sliding a commensurate number of counting beads over one position in accordance calories ingested;

summing the total calorie consumption over the course of a day by the position of the counting beads on the bracelet; and moving the counting beads back to their original position to begin tracking the next day.

7. A system for counting calories, comprising:

a calorie counting bracelet having a plurality of counting beads each with an aperture there through, a line joining said counting beads, and a freespace, said line being strung in a looping manner through the aperture of each counting bead such that the cord overlaps itself within the aperture of each counting bead such that the beads stay in the position to which they are selectively placed;

a wallet card bearing a pre-printed cross-reference of bead values for a subset of most commonly eaten foods; and an instruction booklet instructing the user to slide a commensurate number of beads over one space after eating to indicate calories consumed, to then sum total calorie consumption over the course of a day, to record daily calorie consumption, and to move said beads back to their original position at the start of each new day.

8. The system according to claim 7, further comprising a plurality of summing beads, each of said summing beads having an aperture there through.

9. The system according to claim 8, wherein said summing beads are strung one per every five counting beads, said counting beads having an associative value of 100 calories per bead and being subdivided into groups of 500 calories by said summing beads.

10. The system according to claim 7, wherein said instruction booklet also describes general nutrition guidelines for nutritional adequacy and health promotion.

11. The system according to claim 7, further comprising a comprehensive cross-reference separate from said wallet card that cross-references bead and calorie values for a large group of foods.

12. The system according to claim 11, whereby said comprehensive cross-reference also includes a bead tracking chart for documenting daily, weekly and monthly calorie consumption.

* * * * *